Figure 1:
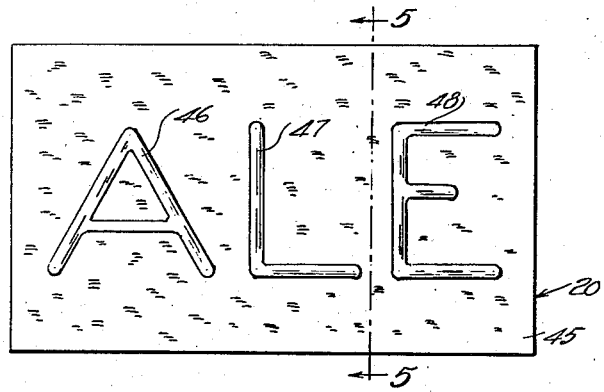

Jan. 2, 1940.  G. MICHEL  2,185,674

DISPLAY SIGN

Filed June 6, 1938   4 Sheets-Sheet 1

Inventor
GEORGE MICHEL,
By Kimmel & Crowell
Attorneys.

Jan. 2, 1940. G. MICHEL 2,185,674
DISPLAY SIGN
Filed June 6, 1938 4 Sheets-Sheet 2

Inventor
GEORGE MICHEL,
By Kimmel & Crowell
Attorneys.

Jan. 2, 1940.  G. MICHEL  2,185,674
DISPLAY SIGN
Filed June 6, 1938  4 Sheets-Sheet 3
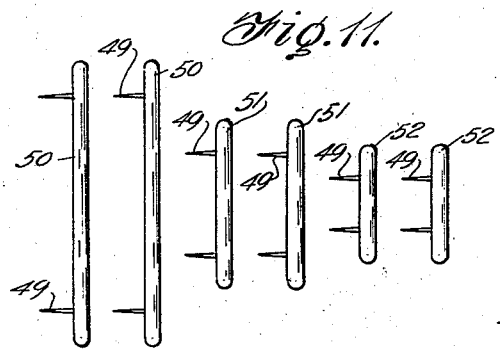
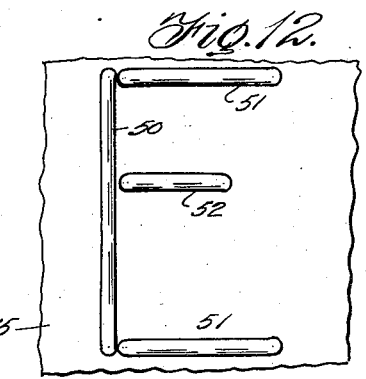
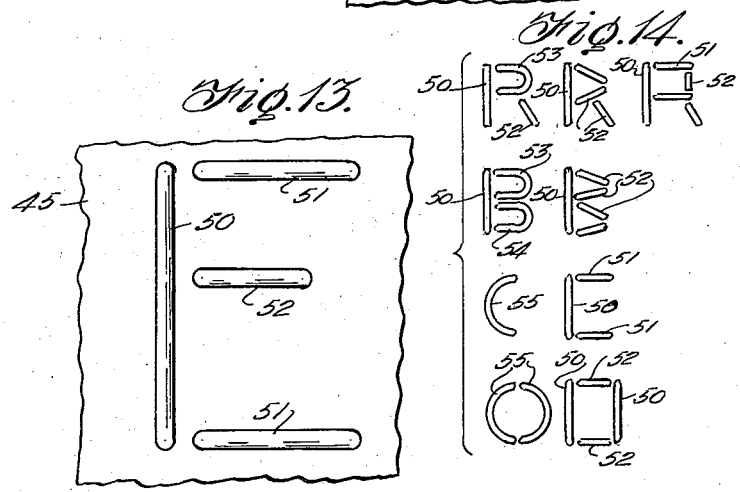
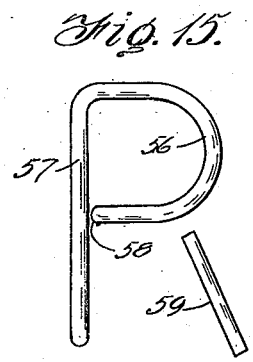
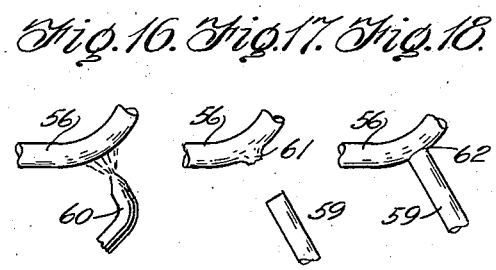
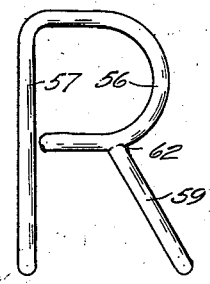
Inventor
GEORGE MICHEL,
By Kimmel & Crowell
Attorneys.

Jan. 2, 1940. G. MICHEL 2,185,674
DISPLAY SIGN
Filed June 6, 1938    4 Sheets-Sheet 4
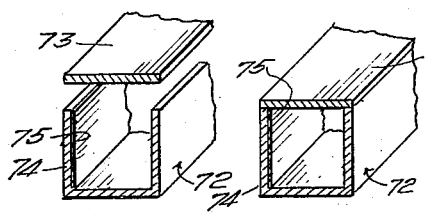
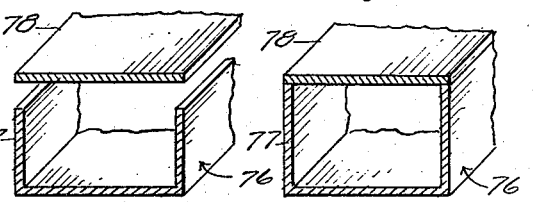
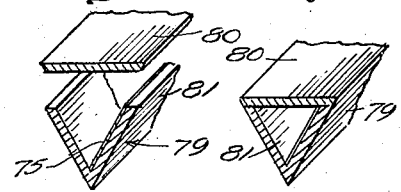
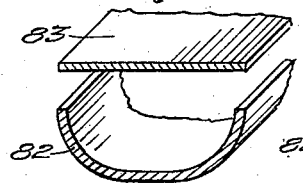
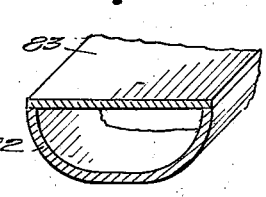
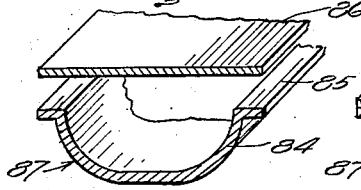
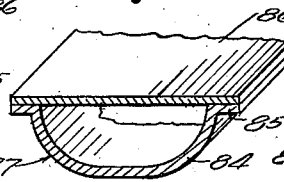
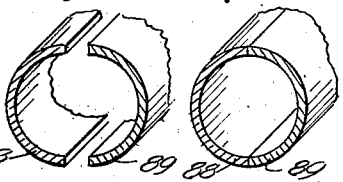
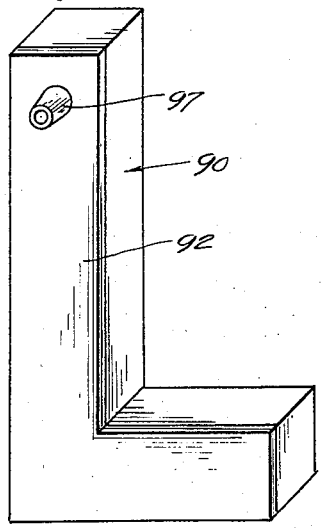
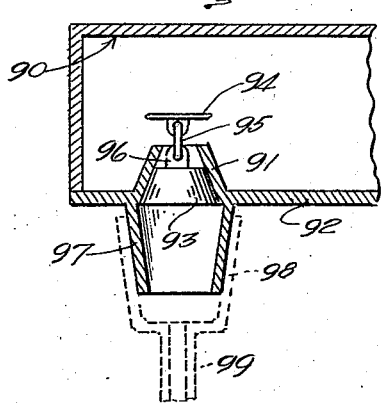
Inventor
GEORGE MICHEL,
By Kimmel & Crowell
Attorneys.

Patented Jan. 2, 1940

2,185,674

UNITED STATES PATENT OFFICE 2,185,674

DISPLAY SIGN

George Michel, Baltimore, Md., assignor to Smithos, Inc., Baltimore, Md., a corporation of Maryland Application June 6, 1938, Serial No. 212,148

9 Claims. (Cl. 40—130)

This invention relates to sign structures and more particularly to an illuminated sign embodying the use of gaseous discharge tubes.

At the present time gaseous discharge tubes are used for illuminated signs and these discharge tubes are directly connected to an electrical discharge means in the form of a high frequency transformer or generator and the characters comprising the sign are formed from glass tubing with the various characters connected together and certain portions of the tubing which it is not desired to illuminate are blanked out by covering the tubing with black paint or like material so as to prevent the illuminated gas within that portion of the tube from being seen. It is an object of this invention to provide a sign structure wherein the characters forming the sign are not connected together, each character being individual so that the characters may be placed flat against a supporting means, if desired, with no portion of the tubing covered up with paint or other material so as to prevent illumination of certain portions thereof.

Another object of this invention is to provide a sign structure embodying the use of gaseous tubes wherein the tubes may be independent one from another and wherein the tubes may be arranged relative to each other so as to produce the desired sign in order that the user of the device may arrange the sign in any manner desired and may change the sign at will without requiring the use of an electrician.

A further object of this invention is to provide an improved method of illuminating gaseous tubes whereby the tubes are independent of the electrical discharge means so that the tubes may be adjusted relative to each other and to the discharge means.

A further object of this invention is to provide in an illuminated sign a plurality of sealed tubes and supporting means therefor, the tubes having means engageable with the supporting means so that the tubes may be removably secured on the supporting means in any desired position so that various arrangements of characters may be produced on the sign, the arrangement including gaseous tubes of different characters, that is, certain of the gaseous tubes being capable of producing one color and certain others of the tubes being capable of producing another color so that the single discharge means inductively associated with the gaseous tubes will be capable of producing multiple colors.

A still further object of this invention is to provide an improved illuminating means wherein the gaseous tube may be freely moved relative to the electrical discharge means so that the gaseous tube may, at will, be removed from the electrical field produced by the electrical discharge means and subsequently brought into the field for illumination of the gas therein.

A further object of this invention is to provide an improved means creating an electrical field of high frequency and a gaseous discharge tube for positioning in the electrical field, the field being of such a character that the gas in the tube will be brightly lighted so that the character formed by the tube will be properly illuminated.

A further object of this invention is to provide an improved display means in the form of a hollow body which is so constructed that it may be made out of composition material, such as phenal condensation product or other non-frangible light transmitting material which is capable of withstanding atmospheric pressure when the interior thereof is evacuated and filled with an inert gas.

Still another object of this invention is to provide an improved method of forming characters, letters or designs from composition material so that various configurations or designs may be produced, the designs being hollow and having an inert gas therein which is adapted to be illuminated when the design is interposed in the field of an electrical discharge means.

A further object of this invention is to provide an improved means for constructing characters or letters which may be removably secured to a supporting means, the letters being of such construction that they will not break as is the case where the letters or characters are formed out of glass.

A further object of this invention is to provide in a display means of this character means whereby the hollow body will be automatically sealed when the air has been evacuated therefrom and an inert gas disposed in the hollow body, the pressure of the gas being less than the atmospheric pressure.

To the foregoing objects and to others which may hereinafter appear, the invention consists of the novel construction, combination and arrangement of parts as will be more specifically referred to and as illustrated in the accompanying drawings, wherein are shown embodiments of the invention, but it is to be understood that changes, variations and modifications may be resorted to which fall within the scope of the invention as claimed.

Figure 2:
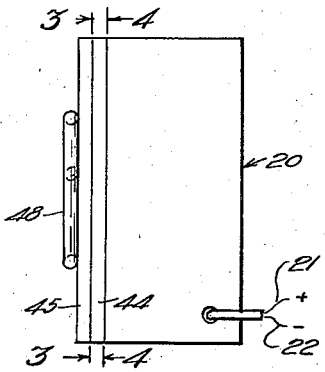
Figure 3:
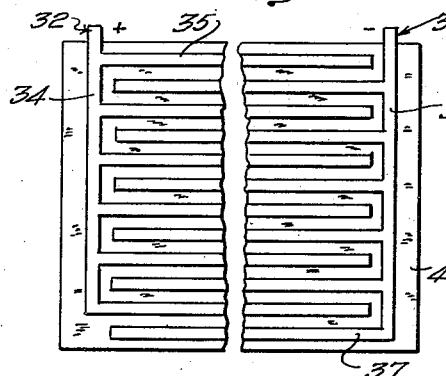
Figure 4:
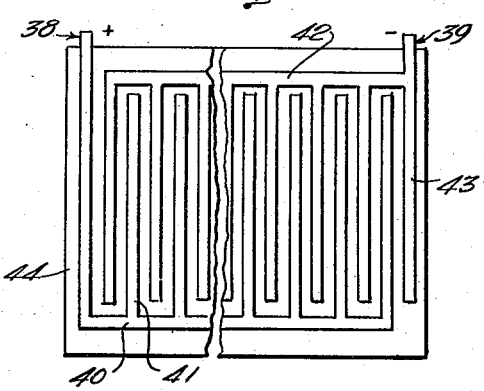
Figure 5:
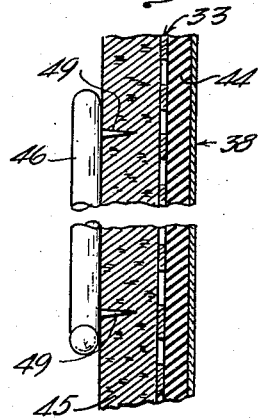
Figure 6:
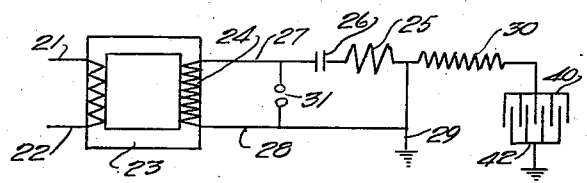
Figure 7:
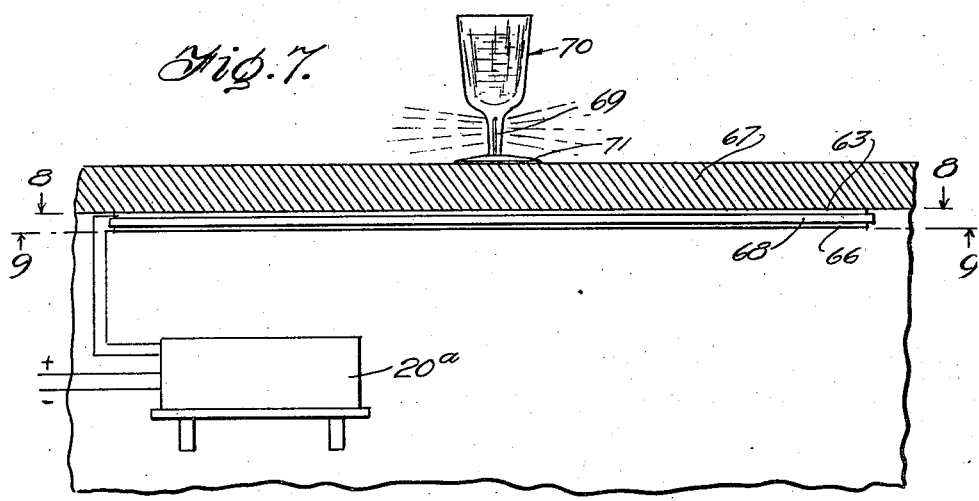
Figure 8:
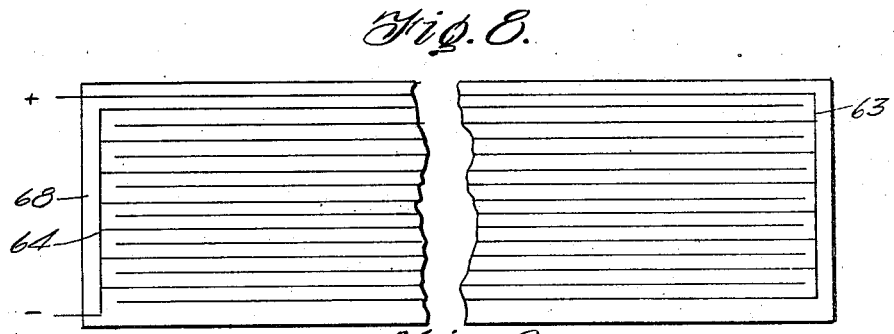
Figure 9:
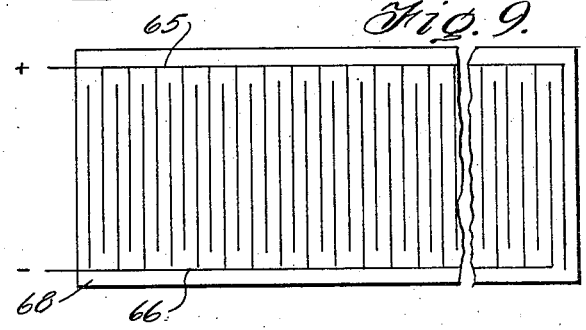
Figure 10:
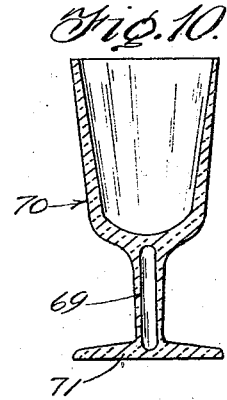

In the drawings:

Figure 1 is a detail front elevation of a sign constructed according to an embodiment of this invention, Figure 2 is a detail end elevation of the sign, Figure 3 is a sectional view partly broken away taken on the line 3—3 of Figure 2, Figure 4 is a sectional view partly broken away taken on the line 4—4 of Figure 2, Figure 5 is a fragmentary vertical section of the front portion of the sign disclosed in Figures 1 and 2, Figure 6 is a diagrammatic view of an electric discharge means with which the sign is associated, Figure 7 is a fragmentary vertical section of a modified form of this invention, Figure 8 is a sectional view taken on the line 8—8 of Figure 7, Figure 9 is a fragmentary sectional view taken on the line 9—9 of Figure 7, Figure 10 is a vertical section of a combined gaseous tube and tumbler or glass, Figure 11 is a detail side elevation of a number of straight gaseous tubes which are provided with prongs or tangs adapted to be engaged with an insulated supporting means and arranged to form characters or designs, Figure 12 is a detail front elevation of the letter "E" formed from straight tubing similar to that disclosed in Figure 11, Figure 13 is a view similar to Figure 12 but showing the tubing in spaced apart relation so as to simulate a stencil, Figure 14 is a detail front elevation of a number of letters formed from straight and curved tubing, Figures 15 to 19 inclusive show a method of forming a letter such as the letter "R" from tubing with the several branches of the letter connected together, Figure 20 is a fragmentary perspective view showing the method of forming a hollow body or tube which is substantially square in transverse section, Figure 21 is a fragmentary perspective view of the completed tube formed after the manner disclosed in Figure 20, Figure 22 is a fragmentary perspective showing the manner of forming a hollow tube or body which is substantially rectangular in transverse section, Figure 23 is a fragmentary perspective view of the completed tube shown in Figure 22, Figure 24 is a fragmentary perspective view of a tubular body formed substantially triangular in transverse section and showing the manner of forming the body, Figure 25 is a fragmentary perspective view of the triangular tube, Figure 26 is a fragmentary perspective view of a semi-oval tube showing the manner of constructing a tube of this kind, Figure 27 is a fragmentary perspective view of the tube constructed according to Figure 26, Figure 28 is a fragmentary perspective view showing the method of forming a semi-oval tube with flanged longitudinal portions, Figure 29 is a fragmentary perspective view of the completed tube shown in Figure 28, Figure 30 is a fragmentary perspective view showing the method of constructing a cylindrical tube, Figure 31 is a fragmentary perspective view of the completed cylindrical tube, Figure 32 is a perspective view of a letter and in this instance the letter "L" is constructed according to an embodiment of this invention, and Figure 33 is a fragmentary sectional view of one end of a tube or letter showing the manner of evacuating and sealing the tube.

Referring to the drawings and first to Figures 1 to 6 inclusive, the numeral 20 designates a housing which is adapted to enclose a high frequency electrical discharge means similar to that at present in use for illuminating the gaseous discharge tubes commonly known as the neon tubes. The housing 20 has a pair of conductors 21 and 22 connected thereto which are adapted to be connected to a suitable source of electrical current supply. The electrical discharge means may include a transformer 23 having the secondary 24 thereof connected to a primary coil 25 with a condenser 26 interposed in the conductor 27. The opposite side of the coil 24 is connected by a conductor 28 to a ground 29 which is connected between the primary 25 and one end of a secondary 30. A spark gap means 31 is connected against the conductors 27 and 28. This type of electrical discharge means is a conventional type and is here disclosed as only one form of electrical discharge means with which the hereinafter described illuminating means may be combined.

A grid 32 is adapted to be connected to the positive side of the secondary 30 of the electrical discharge means and a negative grid 33 is adapted to be connected to the negative or ground side thereof. The grid 32 is constructed in the form of an elongated conductor or bar 34 having secured thereto and projecting laterally therefrom a plurality of spaced apart pairs of electrodes 35. The grid or electrode 33 comprises an elongated bar or metal strip 36 having a plurality of parallel spaced apart strips 37 secured thereto and extending between the strips 35 of the grip member 32.

A second grid means in the form of a pair of electrodes or grid members 38 and 39 is disposed in inwardly spaced relation to the grid members 32 and 33. The grid member 38 is constructed similar to the grid member 32 being constructed in the form of an elongated strip 40 having a plurality of bars 41 secured thereto and extending at right angles from the length of strip or bar 30. The grid 39 is constructed similar to the grid 33 having an elongated strip or bar 42 to which a plurality of parallel and spaced apart strips or bars 43 are connected with the strips or bars 43 extending parallel to and in spaced relation to the strips or bars 41. The grid members 32 and 33 are disposed in superposed or spaced relation to the grid members 38 and 39 by means of insulation 44 and the lengths of the bars 41 and 43 comprising the grid members 38 and 39 are disposed in right angular relation to the lengths of the bars 35 and 37 comprising the grid members 32 and 33 respectively. In this manner one pair of grid members will set up an electrical field which is at right angles to the electrical field of the other pair of grid members.

A plate 45 is disposed at the outer side of the electrodes 32 and 33 and this plate 45 is preferably constructed of relatively soft insulating material and in the present instance is constructed of cork or like material. A plurality of gaseous tubes in the form of characters 46, 47 and 48 are disposed on the outer face of the plate 45 and these characters are each provided with a plurality of tangs or pointed pins 49 which are adapted to be projected into the plate 45 as shown in Figure 5. In this manner the letters or characters 46, 47 and 48 are detachably secured to the outer face of the housing 20 within the electrical field produced by the pairs of grid members hereinbefore described.

The letter 46 is constructed from a glass tube, the ends of which are sealed and this letter 46 is entirely separate and independent from the remaining letters or characters making up the sign. The sign disclosed in Figure 1 shows the word "Ale", this being only one form of a sign structure which may be produced with letters or characters constructed according to this invention. The particular arrangement of the letters relative to each other may be varied at will, the letters being detachably secured to the outer face of the plate 45 in any arrangement which may be desired by the user of the device. The letters herein disclosed are adapted to contain a gaseous composition which is capable of illumination when placed in a high frequency electrical field and the characteristic of the gas within each tube may be varied to suit the particular colors which it is desired to produce in the completed sign structure. As here shown the letters are each formed of one or more tubes, the interior of the several tubes being communicable with each other so that a single gas may be placed in each letter or character. However, if desired, one or more of the branches of each letter may be closed to the remaining branches and each branch provided with a gas different from the other branches in order that different colors or combinations of colors may be produced in the same letter of character.

In Figure 11 there are disclosed a plurality of straight tubes 50, 51 and 52 which are of different lengths and each tube is provided with at least a pair of prongs or tangs 49. These straight tubes are closed at each end and are filled with a gas capable of being illuminated when placed in a high frequency field. The tubes 50, 51 and 52 may be used as shown in Figure 12 for the formation of letters, and in the present instance, are disclosed as being used to form the letter "E". In this form the inner ends of the tubes 51 and 52 are disposed closely adjacent the tube 50 so that when all of the tubes are lighted up by being placed in the electrical field, a substantially solid letter or character will be formed. However, in Figure 13 there is disclosed a similar letter formed from the tubes 50, 51 and 52 but in this instance, the letter is formed to simulate a stencil, this being done by spacing the inner ends of the tubes 51 and 52 from the tube 50. In Figure 14 there are disclosed a number of different letters or characters which may be produced by the tubes 50, 51 and 52 and in certain instances bent tubes such as 53 and 54 may be used with a selected straight tube so as to form several letters or characters, the bent tubes being either U-shaped or C-shaped, or substantially semi-circular as shown at 55. Where semi-circular tubes 55 are used, they may be used in pairs to form the letter "O" or may be used in any other combination so as to produce the desired character, design or letter.

With the use of individual tubes for the individual characters an improved method of producing letters is disclosed in Figures 15 to 19 inclusive. In this improved method the letter is formed from one or more tube sections which are welded together and if desired, the interior of the several tube sections may be communicable with each other so that a single gas can be used in the completed letter. Under the present practice of producing letters, numbers or the like, the glass tube is bent to the general shape of the character or letter and where a branch or extension is desired such branch or extension is produced by bending the tubing rearwardly and then bringing it forward to the desired point, the reverted or rearwardly extending portion of the tubing being blanked out as by paint or the like so that the gas in this reverted portion will not be seen. However, according to the present method of producing letters where it is desired as an example to produce the letter "R", a single piece of tubing is first bent to provide a curved or looped portion 56 which at one end communicates with and is integral with a straight portion 57. The opposite end of the bent portion 56 is sealed as at 58 and instead of reverting the end portion 58 as is the practice at present, so as to produce the branch 59, a separate piece of tubing is provided and the curved portion 56 of the letter at the desired point is heated as by a blow torch 60 and the tubing comprising the members 56 and 57 is then placed under air pressure so as to provide a bulge 61 which is broken and then the branch 59 is brought up against the bulge 61 and welded as at 62. In this manner the interior of the branch 59 will communicate with the interior of the curved portion 56. The end of the branch 59 is then sealed and when the interior of the completed character is evacuated, a suitable luminous gas is inserted therein so that when this completed character is interposed in the high frequency electrical field produced by the electrical discharge means, the gas in the letter will be illuminated. It will be apparent from the foregoing that the letter shown in Figures 15 to 19 inclusive will lie flat against the support and this letter may then be secured to a support such as the support 45 by means of tangs, clips or any other suitable fastening devices.

In Figures 7 to 9 inclusive there is disclosed a modified form of this invention wherein pairs of superposed grid members 63, 64, 65 and 66 are disposed beneath a top portion 67 which may be the top of a bar or table. The pairs of grid members are insulated and separated from each other by an insulated spacing means 68 similar to the insulation 44. The grid members 63, 64, 65 and 66 are connected to the discharge means 20 disclosed in Figures 1 and 2. The discharge means 20ª in the present instance is disclosed as being positioned beneath the top 67 but if desired may be positioned at a point remote from the top 67.

A tube 69 containing a luminous gas is formed as the stem of a tumbler or glass 70. The base 71 of the glass is adapted to be positioned on the top 67 and a liquid or the like may be placed in the tumbler 70 and when the tumbler 70 is positioned on the top 67, the tube 69 which forms the stem of the tumbler will be placed in the field of the grid members and will be thereby illuminated.

In the use and operation of this sign structure, the grid members 32, 33, 38 and 39 may be placed in the desired position and as shown in Figure 7 may if desired be connected to a remotely disposed electrical discharge means. The pairs of grid members are disposed at right angles to each other so as to produce a relatively large electrical field and in this field the characters forming the sign or illuminating means is adapted to be placed. Where a sign similar to that disclosed in Figures 1, 2 and 5 is used, the letters or characters are detachably secured to the supporting plate 45 by projecting the prongs or tangs 49 into the supporting member 45. The letters disclosed in Figure 1 are formed after the method disclosed in Figures 15 to 19 inclusive wherein the several branches of each letter or character communicate one with another and these branches are welded onto the side of the parts of the character or letter. It will be apparent however, that one or more of the different branches or parts of each character may be welded onto the other parts, but the interior of one or more of the branches may be sealed at the point of contact with the other part or parts and in this manner a different character of gas may be placed in the several parts or branches making up the particular sign, letter or character.

Where it is desired to form letters or characacters after the manner disclosed in Figures 11 to 14 inclusive, the sectional pieces forming the letter may be assembled and then mounted on the plate 45 by projecting the tangs or prongs 49 into the relatively soft supporting member 45. When the electrical discharge means is in operation the gas in the characters or tubes will be lighted up by reason of the fact that the tubes are in the electrical field produced by the discharge means and the letters or characters may be varied at will so that a sign of this character may be used where a sign structure is displayed and is changed from day to day or at other periods such as where a sign is displayed showing menus or materials or articles to be sold or the like in a restaurant, store or the like.

Where a display means is used similar to that disclosed in Figures 7 to 10 inclusive, the illuminated article may be removed at will from the support and at any time the article bearing the gaseous tube 69 is placed within the field formed by the grid members, the gas within the tube will be thereby illuminated.

The grid members or electrodes may be constructed in any desired manner such as out of sheet metal, wires, bars or the like, or may be constructed from adhered mercury or similar conducting means.

In Figures 20 and 21 there is disclosed a tube or hollow body which is adapted to be constructed out of the non-frangible material and this material may take the form of a phenal condensation product or other composition which is preferably non-frangible while at the same time having light transmitting characteristics. The tube disclosed in Figures 20 and 21 is first molded in substantially U-shaped form as shown at 72 and a closure plate 73 is adapted to engage against the ends of the free legs 74 of the U-shaped member 72 and be cemented or secured thereto by a sealing means which will substantially produce an integral connection between the plate 73 and the legs 74. The tubular member will then take the form of a tube which is square in transverse section and, if desired, one or more walls of the tube may be provided with a light reflecting surface 75. It will also be apparent that certain of the walls of the tubular member may be formed with opaque material or if desired, may be colored or painted opaque so that such wall or walls as may be desired will not transmit light. As an example, where a letter such as that disclosed in Figure 32 is formed of non-frangible material, at least three walls of the hollow body or tubular member may be opaque and the remaining wall formed of light transmitting material so that only one wall of the character will transmit light. The inner face of the wall opposite from the light transmitting wall may be formed with a coating of light reflecting material 75 so that the light transmitting wall will be relatively bright.

In Figures 22 and 23 there is disclosed a tubular member 76 which is adapted to be formed of non-frangible material, and in this instance, the tube is substantially rectangular in transverse section and the U-shaped member 77 which is initially molded or cast is closed by a closure plate 78 so that a rectangular tube similar to that shown in Figure 23 will be provided.

The tubular body may also take the form of an equi-lateral triangle as shown in Figures 24 and 25. In this form a V-shaped body 79 is initially formed and then a plate 80 is cemented or otherwise securely fastened to the divergent walls of the V-shaped body 79. In this form one wall of the completed tubular member may have a reflecting surface 81.

The tube may also take the form of a semi-oval such as is disclosed in Figures 26 and 27. In this form a semi-elliptical or oval body 82 is initially molded or cast and then a flat plate 83 is secured as by cement or the like to the longitudinal edges of the semi-oval or semi-elliptical member 82. The completed tubular member will then be as shown in Figure 27 and the plate 83 may be the back wall of the tube so that this wall will flatly engage against a flat surface to which the completed character or design is adapted to be attached.

In Figures 28 and 29 there is disclosed a further modification of a tubular body which is provided with a semi-oval or semi-elliptical body 84 having laterally extending flanges 85 along the longitudinal edges thereof. A plate 86 is adapted to be cemented to the flanges 85 so as to form a semi-oval or semi-elliptical tube 87 as shown in Figure 29.

Where it is desired to form a cylindrical tube, two semi-cylindrical sections 88 and 89 may be initially molded or cast and then the endges of the sections cemented together as shown in Figure 31 so as to provide a cylindrical tube.

Where non-frangible material is used in the formation of letters, designs or the like, the composition of the non-frangible material in some instances will not readily permit the application of sufficient heat thereto in order to seal the tubes or box after the air has been evacuated therefrom and an inert gas is inserted therein. Where such is the case, the tube or hollow body may take the form as shown in Figures 32 and 33 wherein the hollow body 90 is provided adjacent one end portion thereof with a frusto-conical valve seat 91 which projects inwardly of a wall 92 thereof. A frusto-conical valve 93 is adapted to engage on the seat 91 and this valve 93 is retained on the body 90 by means of a retaining bar 94 which engages a ring 95 carried by an eye 96. The eye 96 may be provided on the inner or small end of the valve 93. As shown in Figure 33, the valve member 93 may move outwardly to an open position but cannot be pulled completely out of the hollow body or tube 90.

In order to facilitate the evacuation of the body or tube 90 the wall 92 thereof is provided with an outwardly extending tapered or frusto-conical nipple 97. This nipple 97 may be engaged by a tapered connector or cup 98 which is secured to an end of a suction tube 99 connected to a conventional suction device. When the air is being withdrawn from the tube 90 the valve 93 will be pulled outwardly into the nipple 97 to the limit permitted by the link 95 and the bar 94. After the air has been withdrawn an inert gas is forced into the body or tube 90 and when the cup 98 is removed from the nipple 97 the atmospheric pressure will maintain the valve 93 on its seat. It will be apparent however, that if desired, a sealing compound such as cement or the like may be applied about the edges of the valve 93 so as to prevent the possibility of air entering the tube 90 or the gas leaking out.

A tube or character similar to that disclosed in Figure 32 may also be provided with the securing members such as the tangs 49 so that the letter or character may be attached to a suitable support. A character or letter constructed as shown in Figures 20 to 33 inclusive may be freely handled and may be dropped without breaking as is the case where letters or characters are constructed out of glass. The walls of the letters or characters may be sufficiently thick in order to withstand atmospheric pressure so as to prevent collapsing of such walls when the inside of the letter or character is evacuated and a low pressure gas inserted therein.

What I claim is:

1. The method of illuminating gaseous discharge tubes which includes the formation of an electrical field by means of angularly related electrodes connected to an electrical discharge device and positioning a gaseous tube in such field.

2. A gaseous illuminated means comprising an electrical discharge device, superposed right angularly related electrodes connected to said device, and a gaseous tube positionable within the field emanating from said electrodes.

3. A gaseous illuminated means comprising an electrical discharge device, pairs of superposed electrodes connected to said device, the electrodes of one pair being right angularly related to the electrodes of the other pair, and a gaseous tube positioned within the field emanating from said electrodes.

4. A gaseous illuminated means comprising an electrical discharge device, pairs of superposed electrodes connected to said device, the electrodes of one pair being angularly related to the electrodes of the other pair, means supporting one pair of electrodes in spaced relation to the other pair of electrodes, and a gas filled tube positioned in the field emanating from said electrodes.

5. A gaseous illuminated means comprising an electrical discharge device, pairs of superposed electrodes connected to said device, the electrodes of one pair being angularly related to the electrodes of the other pair, means supporting one pair of electrodes in spaced relation to the other pair of electrodes, a plate engaging the outermost pair of said electrodes, a gas filled tube, and means carried by said tube engageable with said plate detachably securing said tube to said plate.

6. An illuminated display means comprising a high frequency electrical discharge means, electrodes connected to said discharge means, a gaseous discharge tube, an insulated plate disposed closely adjacent said electrodes, and tangs carried by said tube engageable with said plate to removably secure said tube to said plate.

7. An illuminated display means comprising a high frequency electrical discharge means, pairs of electrodes connected to said means, one pair of said electrodes being disposed at right angles to the other pair, insulated means between said pairs of electrodes, a plate disposed closely adjacent one pair of electrodes, and gaseous discharge means carried by said plate.

8. An illuminating display means comprising a high frequency electrical discharge means, a pair of electrodes connected to said means, a second pair of electrodes connected to said means and disposed at right angles to said first pair of electrodes, a plate disposed closely adjacent one pair of said electrodes, a plurality of gaseous discharge tubes, and means carried by said tubes for removably holding said tubes on said plate.

9. An illuminating display means comprising a housing, a high frequency electrical discharge means in said housing, a pair of electrodes connected to said means, an insulated plate carried by said housing in parallel relation to said electrodes, a gaseous discharge tube, and means fixed to said tube engaging said plate to secure said tube on said plate.

GEORGE MICHEL.